(12) United States Patent
Stahura et al.

(10) Patent No.: US 11,552,923 B2
(45) Date of Patent: Jan. 10, 2023

(54) WHITELIST DOMAIN NAME REGISTRY

(71) Applicant: Donuts Inc., Bellevue, WA (US)

(72) Inventors: Paul Stahura, Sammamish, WA (US); Christopher L. Cowherd, Bellevue, WA (US)

(73) Assignee: Donuts, Inc., Bellevue, WA (US)

( * ) Notice: Subject to any disclaimer, the term of this patent is extended or adjusted under 35 U.S.C. 154(b) by 0 days.

(21) Appl. No.: 14/985,005

(22) Filed: Dec. 30, 2015

(65) Prior Publication Data

US 2017/0195286 A1     Jul. 6, 2017

(51) Int. Cl.
  *G06F 15/173*   (2006.01)
  *H04L 61/3015*  (2022.01)
  *H04L 61/4511*  (2022.01)

(52) U.S. Cl.
  CPC ...... *H04L 61/3015* (2013.01); *H04L 61/1511* (2013.01); *H04L 61/302* (2013.01)

(58) Field of Classification Search
  CPC .............. H04L 61/3015; H04L 61/302; H04L 61/1511; H04L 61/301
  USPC ......................................................... 709/226
  See application file for complete search history.

(56) References Cited

U.S. PATENT DOCUMENTS

| | | | |
|---|---|---|---|
| 6,338,082 B1 | 1/2002 | Schneider | |
| 6,442,549 B1 | 8/2002 | Schneider | |
| 6,961,783 B1 * | 11/2005 | Cook | H04L 29/12066 709/223 |
| 7,136,932 B1 | 11/2006 | Schneider | |
| 7,188,138 B1 | 3/2007 | Schneider | |
| 7,359,987 B2 | 4/2008 | Stahura | |
| 7,467,230 B2 * | 12/2008 | Majumdar | H04L 29/12132 709/245 |
| 7,493,403 B2 | 2/2009 | Shull et al. | |

(Continued)

FOREIGN PATENT DOCUMENTS

| | | |
|---|---|---|
| CN | 103812963 A | 5/2014 |
| CN | 201680082835.3 | 4/2021 |

(Continued)

OTHER PUBLICATIONS

International Search Report and Written Opinion for International Application No. PCT/US2016/069338 filed on Dec. 29, 2016, Applicant: Donuts, Inc., dated Apr. 20, 2017, 11 pages.

(Continued)

*Primary Examiner* — Anthony Mejia
(74) *Attorney, Agent, or Firm* — Perkins Coie LLP

(57) ABSTRACT

Systems and methods for managing domain name registrations in accordance with rules and regulations of a domain name verification system are disclosed. The disclosed technology enables a domain name verification system to regulate the registration of domain names in accordance with its own domain name registration policies. This disclosed system uses a "whitelist" domain name registry to register "whitelist domain names" once pre-approval to register a corresponding target domain name has been granted. In this manner, the whitelist domain name registry system acts as a repository for pre-approved domain name registrations and enables pre-qualified registrants (including potential or prospective registrants) to then register a target domain name.

29 Claims, 5 Drawing Sheets

(56) References Cited

U.S. PATENT DOCUMENTS

| | | | |
|---|---|---|---|
| 7,539,774 B2 | 5/2009 | Stahura | |
| 7,600,011 B1* | 10/2009 | Urbanek | H04L 29/12066 709/203 |
| 7,620,725 B2 | 11/2009 | Kin et al. | |
| 7,783,780 B2 | 8/2010 | Stahura | |
| 7,797,410 B2 | 9/2010 | Westerdal | |
| 7,877,784 B2 | 1/2011 | Chow et al. | |
| 7,921,063 B1* | 4/2011 | Quinlan | G06N 7/005 706/12 |
| 8,224,994 B1 | 7/2012 | Schneider | |
| 8,244,578 B2 | 8/2012 | Stahura et al. | |
| 8,285,830 B1 | 10/2012 | Stout et al. | |
| 8,656,490 B1* | 2/2014 | Sobel | H04L 63/0807 726/22 |
| 8,893,286 B1 | 11/2014 | Oliver | |
| 8,966,625 B1* | 2/2015 | Zuk | G06F 21/57 726/22 |
| 9,300,623 B1* | 3/2016 | Earl | H04L 61/1511 |
| 9,990,432 B1* | 6/2018 | Lai | G06F 16/951 |
| 9,992,155 B2* | 6/2018 | Pannese | H04L 67/1095 |
| 10,341,323 B1* | 7/2019 | Blinn | H04L 63/0861 |
| 10,467,536 B1* | 11/2019 | Lai | G06N 20/00 |
| 10,498,753 B1* | 12/2019 | Pope | G06F 16/9566 |
| 10,599,632 B2* | 3/2020 | Mohan | G06F 16/2358 |
| 2001/0034657 A1* | 10/2001 | Shuster | G06Q 30/0633 705/26.1 |
| 2002/0019800 A1* | 2/2002 | Shuster | G06Q 40/04 705/37 |
| 2002/0065903 A1 | 5/2002 | Fellman | |
| 2002/0099693 A1 | 7/2002 | Kofsky | |
| 2002/0120623 A1* | 8/2002 | Vivier | G16H 40/20 |
| 2003/0018484 A1 | 1/2003 | Franks et al. | |
| 2003/0149690 A1 | 8/2003 | Kudlacik et al. | |
| 2004/0006597 A1 | 1/2004 | Hughes | |
| 2004/0199493 A1* | 10/2004 | Ruiz | G06Q 30/06 |
| 2004/0220903 A1 | 11/2004 | Shah et al. | |
| 2005/0203891 A1 | 9/2005 | Broadhurst et al. | |
| 2005/0216287 A1 | 9/2005 | Crosby et al. | |
| 2005/0216288 A1 | 9/2005 | Parsons | |
| 2006/0212931 A1* | 9/2006 | Shull | H04L 63/104 726/10 |
| 2006/0218289 A1 | 9/2006 | Assad | |
| 2006/0230380 A1 | 10/2006 | Holmes et al. | |
| 2006/0282795 A1* | 12/2006 | Clark | H04L 61/3015 715/840 |
| 2007/0041393 A1* | 2/2007 | Westhead | H04L 29/12066 370/428 |
| 2007/0130284 A1 | 6/2007 | Stahura | |
| 2007/0192493 A1* | 8/2007 | Manolache | G06Q 10/107 709/226 |
| 2007/0299967 A1 | 12/2007 | Brady | |
| 2008/0021890 A1* | 1/2008 | Adelman | G06F 17/30867 |
| 2008/0022013 A1* | 1/2008 | Adelman | H04L 29/12066 709/245 |
| 2008/0028100 A1* | 1/2008 | Adelman | G06Q 10/107 709/245 |
| 2008/0028443 A1* | 1/2008 | Adelman | G06Q 10/107 726/4 |
| 2008/0034211 A1 | 2/2008 | Shull et al. | |
| 2008/0065611 A1 | 3/2008 | Hepworth et al. | |
| 2008/0092242 A1 | 4/2008 | Rowley | |
| 2008/0235383 A1 | 9/2008 | Schneider | |
| 2008/0270203 A1 | 10/2008 | Holmes et al. | |
| 2008/0271158 A1* | 10/2008 | Kamperman | H04N 21/43615 726/27 |
| 2009/0164661 A1* | 6/2009 | Kim | H04L 67/1002 709/238 |
| 2010/0023592 A1 | 1/2010 | Parsons et al. | |
| 2010/0217842 A1 | 8/2010 | Shuster | |
| 2010/0306820 A1* | 12/2010 | Battistello | H04L 63/0254 726/3 |
| 2010/0312875 A1* | 12/2010 | Wilerson | H04L 61/1511 709/224 |
| 2010/0332607 A1 | 12/2010 | Seon et al. | |
| 2011/0083180 A1* | 4/2011 | Mashevsky | G06F 21/56 726/23 |
| 2011/0119484 A1 | 5/2011 | Jallad et al. | |
| 2011/0185049 A1 | 7/2011 | Atreya et al. | |
| 2012/0017259 A1 | 1/2012 | Maccarthaigh et al. | |
| 2012/0144499 A1 | 6/2012 | Tan et al. | |
| 2012/0239731 A1 | 9/2012 | Shyamsunder et al. | |
| 2013/0007271 A1 | 1/2013 | Stout et al. | |
| 2014/0143331 A1* | 5/2014 | Smith | H04L 29/12641 709/204 |
| 2014/0283106 A1* | 9/2014 | Stahura | G06Q 10/06 726/27 |
| 2015/0074221 A1* | 3/2015 | Kuparinen | H04L 29/12066 709/214 |
| 2015/0100507 A1 | 4/2015 | Levac et al. | |
| 2015/0213131 A1* | 7/2015 | Styler | H04L 61/1511 707/767 |
| 2015/0312214 A1* | 10/2015 | Windsor | H04L 63/1408 726/12 |
| 2016/0055490 A1* | 2/2016 | Keren | G06Q 30/00 705/14.47 |
| 2016/0117789 A1* | 4/2016 | Ptalis | H04L 61/302 705/80 |
| 2016/0119282 A1* | 4/2016 | Bladel | H04L 61/302 709/203 |
| 2016/0241510 A1* | 8/2016 | Kamdar | H04L 61/302 |
| 2017/0093793 A1* | 3/2017 | Waldron | H04L 61/1511 |
| 2017/0186061 A1* | 6/2017 | Minardos | H04L 61/302 |
| 2017/0195286 A1 | 7/2017 | Stahura et al. | |
| 2018/0113946 A1* | 4/2018 | Sakorafis | G06F 16/9535 |
| 2018/0309713 A1* | 10/2018 | Brown | G06F 16/951 |
| 2018/0343230 A1* | 11/2018 | Gould | H04L 41/0893 |
| 2020/0074106 A1* | 3/2020 | Narayanaswamy | G06F 16/285 |

FOREIGN PATENT DOCUMENTS

| | | |
|---|---|---|
| EP | 3398317 A4 | 8/2019 |
| WO | 2010090357 | 8/2010 |
| WO | WO-2010090357 A1 | 8/2010 |
| WO | 2014152456 | 9/2014 |

OTHER PUBLICATIONS

Hollenbeck Verisign S et al: "Domain Registry Grace Period Mapping for the Extensible Provisioning Protocol; draft-hollenbeck-epp-rgp-02.txt", Domain Registry Grace Period Mapping for the Extensible Provisioning Protocol; Draft-Hollenbeck-EPP-RGP-02. TXT, Internet Engineering Task Force, IETF; Standardworkingdraft, Internet Society (ISOC) 4, Rue Des Falaises CH—1205 Geneva, Switzerland, No. 2, Dec. 16, 2003 (Dec. 16, 2003), XP015014491.

Extended European Search Report in Application No. 16882709.5, dated Jul. 9, 2019, 8 pages.

International Search Report and Written Opinion for PCT/US2014/027359 filed on Mar. 14, 2014, dated Aug. 26, 2014, 8 pages.

ICANN and IANA Reserved Names, Timothy Denton and Mawaki Chango, Mar. 2007, 5 pages.

GTLD Applicant Guidebook, ICANN Jun. 4, 2012 Versions, "(1) Internet Corporation for Assigned Names and Numbers (ICANN), incorporated on Sep. 30, 1998; (2) Trademark Clearing House, proposed and strawmaned by ICANN in Nov. 2012 at meetings in Los Angeles and ICANN's Applicant Guidebook for new gTDLs dated Jun. 4, 2012, emphasis on ICANN's mandate, ICANN's Trademark Clearinghouse and ICANN's Applicant Guidebook," 338 pages.

Canadian First Examination Report for C-Pending Canadian Application No. 2,902,138, Applicant: Donuts Inc., dated Sep. 18, 2015, 7 pages.

Australian Examination Report for Co-Pending Australian Application No. 2014239689, Applicant: Donuts Inc., dated Oct. 29, 2015, 4 pages.

Canadian Second Examination Report for Co-Pending Canadian Application No. 2,902,138, Applicant: Donuts Inc., dated Nov. 16, 2015, 13 pages.

(56) References Cited

OTHER PUBLICATIONS

Australian Second Examination Report for Co-Pending Australian Application No. 2014239689, Applicant: Donuts Inc., dated Aug. 12, 2016, 4 pages.

Canadian Third Examination Report for Co-Pending Canadian Application No. 2,902,138, Applicant: Donuts Inc., dated Jun. 2, 2016, 9 pages.

Australian Examination Report for Co-Pending Australian Application No. 2014239689, Applicant: Donuts Inc., dated Nov. 4, 2016, 3 pages.

Australian Examination Report dated Aug. 10, 2017 in Application No. 2016250487, 3 pages.

Exam Report dated Jul. 11, 2017 in Canadian Application No. 2,902,138, 7 pages.

Extended European Search Report dated Nov. 7, 2016 in European Application No. 14768549, 8 pages.

International Search Report and Written Opinion dated Apr. 20, 2017 in International Application No. PCT/US2016/069338, 9 pages.

Lozano Icann G. "Mark and Signed Mark Objects Mapping; draft-lozano-tmch-smd-00.txt", Internet Engineering Task Force (IETF); Standardworkingdraft, Internet Society (ISOC) 4, Mar. 11, 2013, pp. 1-25.

ACPA, "The Anticybersquatting Consumer Protection Act," Senate Committee Report accompanying S. 1255, Aug. 5, 1999, available at https://www.congress.gov/congressional-report/106th-congress/senate-report/140 (accessed Mar. 22, 2017).

"Cybersquatting," https://en.wikipedia.org/wiki/Cybersquatting, as archived Jan. 2010, (accessed Mar. 22, 2017).

Jeremy D. Mishkin, Master of Your Domain—An Overview of the Anticybersquatting Consumer Protection Act, 18 COMM. LAW. 3, 7 (Mar. 2000).

Trademark Clearinghouse, available at http://www.trademark-clearinghouse.com/ (accessed Mar. 22, 2017).

Trademark Cyberpiracy Prevention Act, S. 1255 106th Congress (1999-2000), available at https://www.congress.gov/106/bills/s1255/BILLS-106s1255eah.pdf (accessed Mar. 17, 2017).

Trademark Clearinghouse Guidelines, version 1.0, Mar. 9, 2013 (Mar. 9, 2013), available at https://web.archive.org/web/20130309025237if_/http://www.trademarkclearinghouse.com:80/sites/default/files/fil es/down loads/TMCH%20guidelines%20v1.0%20_1.pdf (retrieved on Apr. 1, 2020).

European Examination Report for Co-Pending European Application No. 14768549.9, Applicant: Donuts Inc., dated Apr. 7, 2020, 8 pages.

"Extended European Search Report, EP16882709.5, dated Jul. 9, 2019, 13 pages.".

"First Chinese Office Action for ZL201680082835.3, dated Jun. 15, 2020, 6 pages.".

"International Search Report and Written Opinion for PCT/2014/027359 filed Mar. 14, 2014, dated Aug. 26, 2014, 10 pages.".

* cited by examiner

WHITELIST DOMAIN NAME REGISTRY

BACKGROUND

The Internet connects computers, computer networks, and users throughout the world. Computing resources, such as web servers, connected to the Internet are each assigned an Internet Protocol ("IP") address that represents the online "location" of that resource. IP addresses, which are defined by a set of numeric values (e.g., 143.254.4.17 (IPv4) or 172f:ad57:cd40:d089:4fe4:d1e1:100d:5b31 (IPv6)), are often difficult for humans to remember. Domain names, such as "acme.com" or "acme.net," which are often easier for humans to remember, provide a convenient alternative to IP addresses. Rather than remembering and entering an unremarkable string of numbers to access a website, a user can simply enter a corresponding domain name. A domain name is a string of characters (e.g., numbers or letters) specifying a top-level domain ("TLD") (e.g., .com, .net, .org, .guru) and one or more sub-domains. For example, "acme.com" comprises the sub-domain (or sometimes called the second-level domain or "SLD") "acme" (which is itself comprised of a string of characters, or sometimes called simply a "string") under the TLD ".com."

Domain name registries (e.g., NEUSTAR, Inc.) are entities that administer or operate TLDs. In the domain name industry, registries serve essentially as "wholesalers," and only rarely interact directly with domain name applicants, or registrants, who wish to register domain names. Typically, domain names are registered through registrars, which serve as the domain name industry's retailers and may be accredited by the Internet Corporation for Assigned Names and Numbers, or "ICANN." Each registry (or "registry system") maintains databases of currently-registered domain names, each database identifying the SLDs that are registered in a corresponding TLD, who holds the registration, and other identifying information and can provide access to this information via various databases and servers, such as WHOIS servers, Domain Name System (DNS) servers, Registration Data Access Protocol (RDAP) servers, Registration Data Discovery Service (RDDS) servers, and so on. When a party wishing to register a domain name submits a corresponding request, the registrar submits the request to the relevant registry. If the domain name is available (i.e., not then currently registered), the registry typically allows the domain name to be registered to the first requesting party. As an alternative to this "first-come, first-serve" system, registries may auction domain names, use "sunrise periods" (during which qualified claimants with certain rights to marks, such as a trademark, are offered preferential registration rights), and/or offer rights of first refusal. Currently, ICANN controls the addition of new TLDs to the root domain name server, which then makes those TLDs available to users of the Internet.

DETAILED DESCRIPTION

Figure 1:
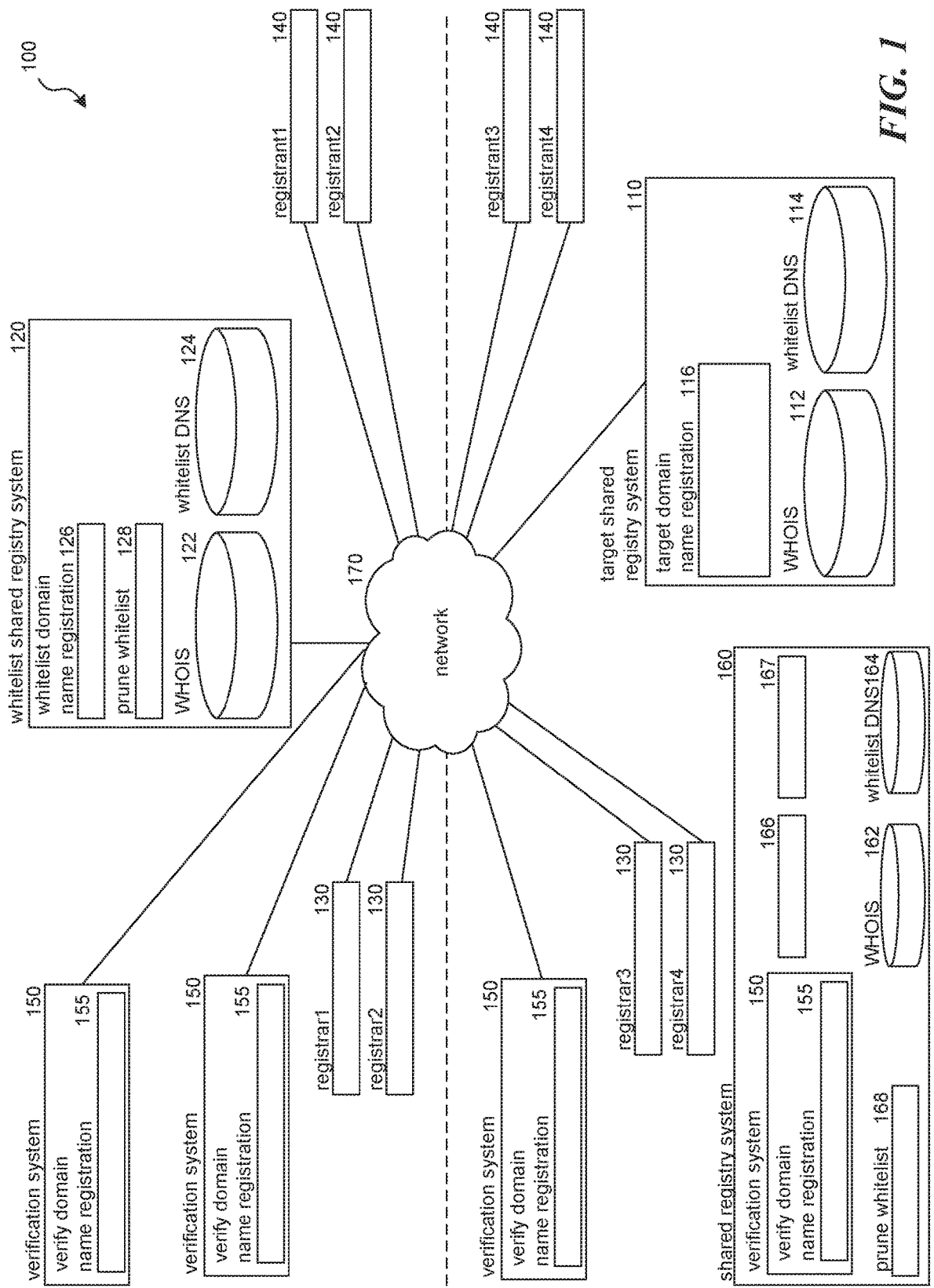
FIG. 1 is a block diagram illustrating an environment in which the disclosed system may operate.

In some cases, a domain name registration may be subject to control or oversight by a domain name verification system ("verification system") or domain name registration manager. A domain name verification system may be under the control of a registrar, a registry operator, a third party, or any combination thereof. For example, certain registrations may be subject to control or oversight by an authority (e.g., a government) due to the contents or meaning of the domain name, the identity of the registrant, the identity of the registrar, the TLD's rules, or any combination thereof, and so on. The domain name registry responsible for a particular top level domain (or a subdomain name thereof) thus may require pre-approval before allowing registrants and/or registrars to register a domain name within that top level domain (or a subdomain thereof). In some embodiments, the disclosed techniques are an extension to the domain name system and other systems that underlie the Internet and enable intermediaries (e.g., verification systems) to oversee the registration of domain names in an automated and efficient matter.

Systems and methods for managing domain name registrations in accordance with rules and regulations of a domain name registration manager and/or verification system are disclosed. The disclosed technology enables a domain name registration manager or verification system to regulate the registration of domain names in accordance with its own domain name registration policies. This disclosed system uses a "whitelist" domain name registry to register "whitelist domain names" once pre-approval to register a corresponding target domain name has been granted. Once the registrant and/or registrar are established to be qualified, the facility can generate a whitelist domain name for the whitelist domain name registry (e.g., "registrantID.registrarID.donuts.domains.valid.zone") and register the generated whitelist domain name with the whitelist domain name registry. In this case, the "valid.zone" subdomain of the ".zone" top level domain acts as a domain for registering whitelist domain names. Thus, the "valid.zone" subdomain is a "whitelist domain" for registering whitelist domain names. Subsequent attempts to register the domain name "donuts.domains" can be checked against the whitelist registry to determine whether the registrant and/or registrar attempting to register "donuts.domains" is/are pre-approved to register "donuts.domains." In this manner, the whitelist domain name registry system and its associated DNS server act as a repository for pre-approved domain name registrations and enable the pre-qualified registrants (including potential or prospective registrants) to then register a target domain name.

In some embodiments, the disclosed system includes multiple domain name registry systems, including one or more whitelist domain name registry systems (where whitelist domain names are registered) and one or more target domain name registry systems (where domain names for accessing sites via a network (e.g., the Internet) are registered). The whitelist domain name registry system receives, from a domain name registrar (e.g., GODADDY, ENOM), a request to register a target domain name (e.g., "website.domains"). For example, the whitelist domain name registry system may receive a set of one or more commands to register the target domain name, including an indication of the domain name, registration credentials (e.g., credentials for a registrant, credentials for a registrar, etc.), and so on. If the whitelist domain name registry system determines that the requested registration is available and subject to control or oversight by a verification system, the whitelist domain name registry system submits a request to the verification system, which can either approve or deny the request. Each verification system may specify various requirements for approval. For example, a government may require both a) a review and approval of a registrant's identification and/or b) a review and approval of a domain name to confirm that the domain name is not prohibited or otherwise reserved (e.g., a verification system may first verify that the requested domain name does not include any obscene or otherwise offensive language before approving the request). Each verification process may be performed automatically and/or with human input. In some embodiments, if the verification system has not yet reviewed or approved an application (e.g., if verification is pending for the application), the whitelist registry can withhold the registration from the DNS and other servers (e.g., a WHOIS server) by placing a "hold" status on the whitelist domain name, such as a server hold. In this manner, subsequent attempts to register the whitelist domain name can be blocked until the hold on the whitelist domain name is removed. Once the verification system provides an indication that the registration is approved (i.e., verification is approved), the whitelist registry system can remove the hold. Otherwise, if the verification system denies the application, the whitelist registry system can delete the registration entirely, thereby removing the hold. Furthermore, if the registration application is approved by the verification system, then the hold on the whitelist domain name can be removed and the whitelist domain name can be published (e.g., in the whitelist registry system DNS server and/or other servers). In this manner, the system can apply a first come, first served order to registration of whitelist domain names. In some embodiments, the request may include credentials for the registrant and the registrar, such as a user identification and password, a secure token, government issued proof of identification (e.g., passport, driver's license), and so on. In some embodiments, the system may require verifiable or authenticated credentials. In some cases, the system may rely on uncertified credentials. In some cases, the generated whitelist domain name can be identical to the target domain name.

In some embodiments, after the registration is approved by the verification system, the whitelist domain name registry system generates one or more whitelist domain name versions for the requested domain name for registration in the whitelist domain name registry system. For example, a whitelist domain name may be generated by concatenating some combination of identification information for the registrant, identification information for the registrar, the target domain name, ".", and/or a predetermined top-level domain name (or a subdomain thereof) corresponding to a whitelist domain name. For example, for a registrant named "John Doe" attempting to register the target domain name "website.domains" via registrar GODADDY, the disclosed system may generate, as a whitelist domain name, "John_Doe-.GODADDY.website.domains.valid.zone." Registering this whitelist domain name in the whitelist domain name registry system indicates to other domain name registry systems that "John Doe" is pre-approved to register "website.domains" via registrar GODADDY. This indication can be communicated to the other domain name registry systems via, for example, the DNS, the RDAP, the WHOIS, RDDS, protocols, and so on. In some embodiments, the disclosed system may generate multiple whitelist domain names for registrations, such as "John_Doe.website.domains.valid.zone" (indicating that "John Doe" is pre-approved to register "website.domains,") and "GODADDY.website.domains.valid.zone" (indicating that registrar GODADDY is pre-approved to register website.domains on behalf of at least one registrant). In this example, the subdomain name "valid.zone" is employed to register whitelist domain names. One of ordinary skill in the art will recognize that other top level domain names (or subdomains) may be employed for whitelist registration purposes (e.g., "valid.zone," "whitelist.domains," "safe.systems," ".whitelist"), including non-English domains and subdomains that include non-English characters (e.g., "有効.zone"). In some embodiments, one or more of the components of the whitelist domain name may be encrypted before and/or after being combined with other components, including, for example, applying a cryptographic hash function (e.g., SHA-2 (Secure Hash Algorithm 2), MD6 Message-Digest Algorithm) to the components and/or composition(s) of components. One of ordinary skill in the art will recognize that other cryptographic hash functions or encryption techniques may be employed. Furthermore, each verification system may establish different procedures for generating whitelist domain names, such as different components, different whitelist domains, different orders of the components, and so on. In some cases, a verification system may receive registration requests directly from registrants or registrars and, upon approval, register a corresponding whitelist domain name or names with a whitelist domain name registry system.

In some embodiments, after the whitelist domain name(s) are generated, the disclosed system registers the generated whitelist domain name(s) with the whitelist domain name registry system. The disclosed system can register whitelist domain name(s) using a standard Extensible Provisioning Protocol ("EPP") message for registering domain names. Once the whitelist domain name(s) are registered, the whitelist domain name registry system can be used to determine whether a registrant and/or registrar is/are pre-approved by the appropriate verification system to register a corresponding target domain name. However, registering the whitelist domain name does not register the target domain name.

In some embodiments, after registration of a target domain name has been approved by, for example, registering the appropriate whitelist domain name(s) with the whitelist domain name registry system, the registrant or registrar may submit a request to register the domain name with the appropriate domain name registry. If the domain name registry determines that the registrant, registrar, and/or domain name are subject to oversight or control by a verification system, the domain name registry generates one or more whitelist domain names in accordance with the procedures established by the corresponding verification system. The disclosed system then checks an appropriate whitelist domain name registry system to determine whether the newly-generated whitelist domain name is registered. These checks can be performed by, for example, querying the WHOIS or DNS server of the whitelist domain name registry system, sending an appropriate EPP communication to the whitelist domain name registry system, and so on. If the whitelist domain name(s) are not registered, then pre-approval to register the target domain name has not been granted. In this case, the disclosed system denies the registration and notifies the appropriate registrant and/or registrar of the failure.

In some embodiments, after the system determines that pre-approval to register a target domain name has been granted, the system determines whether the requesting party or parties are the same party or parties that were granted pre-approval. For example, the request to register the target domain name may include credentials for the registrant and/or the registrar. These credentials can be compared to registration information stored in the whitelist domain name registry system in association with the registered whitelist domain name(s). As another example, if the procedures for generating the whitelist domain name require unique identification information for the registrant and/or registrar, the disclosed system can at least partially validate the request by the existence of the whitelist domain name(s) in the whitelist domain name registry system. For example, if each whitelist domain name is generated using a registrar's IANA number (i.e., a unique value assigned to the registrar by the Internet Assigned Numbers Authority ("IANA")) and a unique identification number for the registrant (e.g., a government-issued identification number), then the whitelist domain name itself includes identification information and can be used to validate both the registrar and the registrant. Alternatively, if the whitelist domain name is not generated using unique identification for the registrant and/or registrar, then other identification means may be employed to verify the identity of one or both. For example, the system may retrieve identification information from a record stored in association with the registered whitelist domain name(s), such as a DNS TXT record, a DNS NS record, a DNS A record, a WHOIS record, and so on. In this manner, the system protects against registrants and registrars who have not been pre-approved to register domain names for which others have sought and received pre-approval. One of ordinary skill in the art will recognize that the identification of the involved parties may be verified using any number of means.

In some embodiments, once the registrant and/or registrar are verified to have pre-approval to register the target domain name, the system registers the target domain name with a public domain name system server, which enables traffic to be directed to the registrant's site using the registered target domain name. In this manner, the registrant is able to register the target domain name after seeking pre-approval for the registration from a verification system and having a corresponding whitelist domain name or names registered with a whitelist domain name registry system.

In some embodiments, various components described above may exist within a single computing system or may be distributed among multiple computing systems. For example, a verification system may be part of a registrar or registry's local computing environment. As another example, a single shared registry system may include components for managing domain name registrations in accordance with whitelist procedures in addition to a whitelist domain name registry system and a non-white list domain name registry system. Similarly, a single domain name system server may include registrations for both target domain names and whitelist domain names.

FIG. 1 is a block diagram illustrating an environment 100 in which the disclosed system may operate in accordance with some embodiments of the disclosed technology. In this example, environment 100 includes target shared registry system 110, whitelist shared registry system 120, registrars 130, registrants 140, verification systems 150, shared registry system 160, and network 170. Target shared registry system 110 includes WHOIS database server 112, domain name system server 114, and target domain name registration component 116. WHOIS database server 112 stores information pertaining to the registered users or assignees of various resources, such as registered domain names. Domain name system server 114 translates domain names and hostnames into the corresponding numeric addresses, such as an IP address and can include additional DNS records. Target domain name registration component 116 is invoked by a shared registry system to register domain names on behalf of a registrant and/or registrar. Whitelist shared registry system 120 includes WHOIS database server 122, whitelist domain name system server 124, whitelist domain name registration component 126, and prune whitelist component 128. WHOIS database server 122 stores information pertaining to the registered users or assignees of various resources, such as registered domain names. In some embodiments one or more WHOIS database servers may be replaced by, or used in conjunction with, other systems, such as an RDAP server, an RDDS server, and so on. Whitelist domain name system server 124 stores registered whitelist domain names and can include additional DNS records. Whitelist domain name registration component 126 is invoked by a registry system to register whitelist domain names on behalf of a registrant and/or registrar in response to receiving an indication that the registrant and/or registrar have been pre-approved by a corresponding verification system. Prune whitelist component 128 may be invoked by whitelist shared registry system 120 periodically (e.g., once per second, once per minute, hourly, daily, weekly, monthly) to remove expired whitelist domain names from whitelist shared registry system 120. Domain name verification systems 150 include verify domain name registration component 155. Shared registry system 160 includes WHOIS database server 162, domain name system server 164, target domain name registration component 166, whitelist domain name registration component 167, domain name verification system 150, and prune whitelist component 168. Each shared registry system is managed by a registry operator that manages one or more top-level domain registries. For example, DONUTS Inc. administers ".shoes," ".domains," and so on while NEUSTAR, Inc. administers ".us," ".biz," and so on. Each registrar 130 manages the reservation of domain names offered by a shared registry system to registrants. For example, ICANN-accredited Internet domain name registrar GODADDY manages millions of domain names on behalf of millions of customers. Each registrant 140 represents an individual or entity (e.g., a corporation) that has registered or would like to register one or more domain names. Each verification system 150 is responsible for controlling or overseeing particular registrations. For example, one verification system may oversee registrations within a particular top level domain (or subdomain), such as ".management," ".seattle.community," ".east.kingcounty.community," and so on. As another example, one verification system may oversee registrations by particular domain registrars or registrants, such as all registrars or registrants within a particular country or jurisdiction. In some cases, each domain name registration system must obtain oversight or control permissions from the shared registry system responsible for the corresponding top level domain. For example, DOMING pizza may want to oversee registrations in the "dominos.pizza" subdomain of the ".pizza" top level domain. In this example, DOMINOS PIZZA could request permission from DONUTS Inc. (the registry operator that manages the ".pizza" top level domain) to ensure that, for example, only affiliates or franchisees can register domain names under the "dominos.pizza" subdomain. If granted, DOMING PIZZA could establish a verification system to oversee and control registrations within the reserved or protected "dominos.pizza" subdomain. Verification systems may exist to comply with local legal requirements. A registry operator may charge a fee to allow another entity to establish or otherwise use a whitelist domain name registry system. In some embodiments the systems and various components of environment 100 communicate via network 170 or directly via wired or wireless communication connections (e.g., radio frequency, WIFI, BLUETOOTH).

In some embodiments, environment 100 includes multiple whitelist shared registry systems and/or multiple target shared registry systems. In some embodiments, a single shared registry may include one or more whitelist domain name system servers and one or more target domain name system servers. In some embodiments, a single domain name system server may include registrations for both whitelist domain names and target domain names such that registrations for whitelist domain names and target domain names are managed by a single shared registry system.

The computing devices on which the disclosed systems are implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, e.g., a computer-readable medium that contains the instructions. In addition, the instructions, data structures, and message structures may be stored or transmitted via a data transmission medium, such as a signal on a communications link and may be encrypted. Non-transitory computer-readable media include tangible media such as storage media, hard drives, CD-ROMs, DVD-ROMS, and memories such as ROM, RAM, and Flash memories that can store instructions. Signals on a carrier wave such as an optical or electrical carrier wave are examples of transitory computer-readable media. Furthermore, "computer-readable devices" includes input, output, storage, and other devices but does not include transitory, propagating signals. Various communications links may be used, such as the Internet, a local area network, a wide area network, a point-to-point dial-up connection, a cell phone network, and so on.

The disclosed systems may be described in the general context of computer-executable instructions, such as program modules, executed by one or more computers or other devices. Generally, program modules include routines, programs, objects, components, data structures, and so on, that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology. For example, various systems may transmit data structures and other information using various protocols, such as the hypertext transfer protocol (HTTP), the transmission control protocol (TCP), the WHOIS protocol, the extensible provisioning protocol (EPP), RDAP, and so on.

Figure 2:
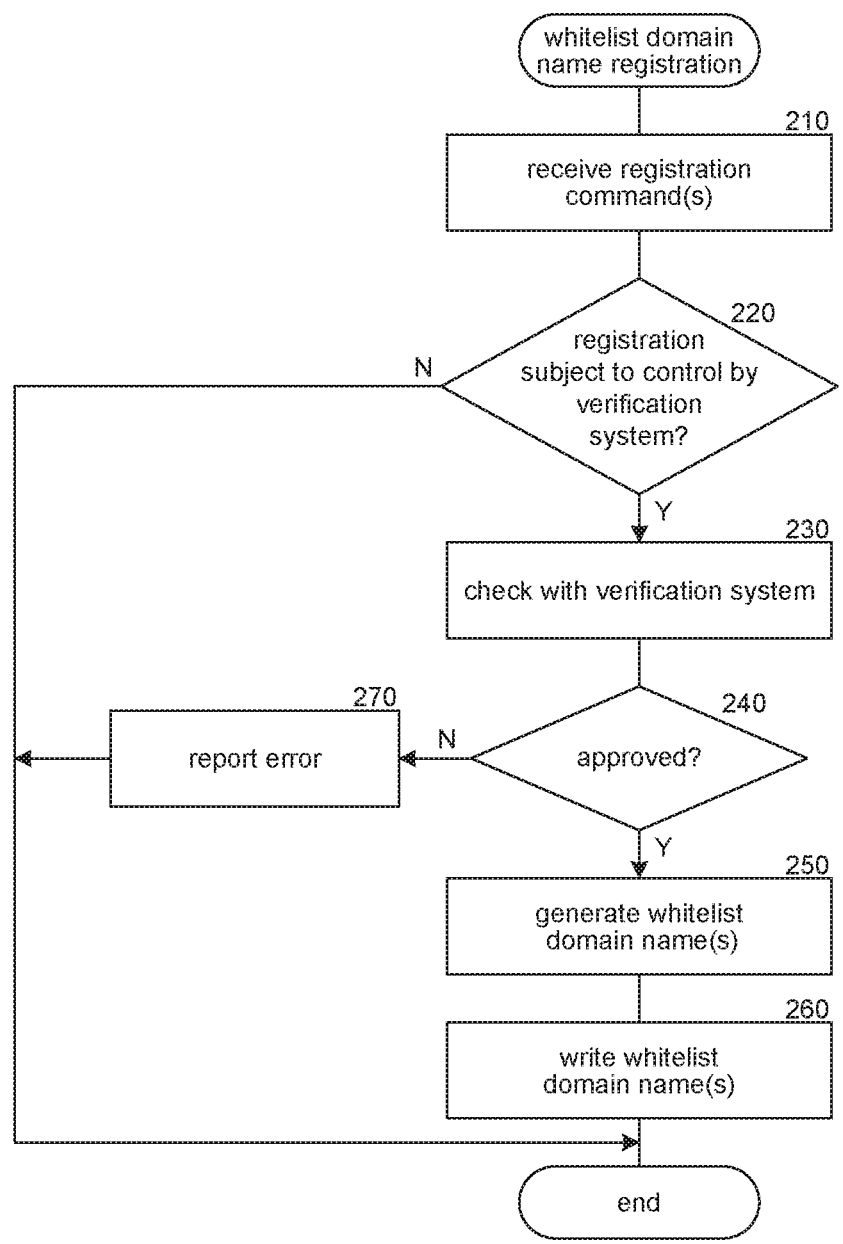
FIG. 2 is a flow diagram illustrating the processing of a whitelist domain name registration component.

FIG. 2 is a flow diagram illustrating the processing of a whitelist domain name registration component in accordance with some embodiments of the disclosed technology. The whitelist domain name registration component is invoked by a shared registry system to generate and register whitelist domain names upon determining that the registration of a corresponding target domain name had been pre-approved. In block 210, the component receives one or more commands to register a target domain name, such as a command to register "availabledomain.domains" and/or a command that includes credentials for a registrant, registrar, and so on. In decision block 220, if the registration is subject to oversight or control by a verification system (e.g., if the originating registrant or registrar is subject to legally mandated oversight or the target domain name belongs to a reserved or protected top level domain or subdomain), then the component continues at block 230, else processing of the component completes. In block 230, the component checks with the corresponding verification system to determine whether the registration is approved by the corresponding verification system. For example, the system may send identification and/or credential information to the corresponding verification system along with the target domain name. In decision block 240, if the registration is approved by the corresponding verification system, then the component continues at block 250, else the component continues at block 270, reports that the registration has not been approved, and completes. In block 250, the component generates a whitelist domain name for the registration in accordance with predetermined policies established by the corresponding verification system, the whitelist shared registry system, or another entity. In block 260, the component writes the generated whitelist domain name in a domain name registry and then completes. In some embodiments, a means for registering whitelist domain names comprises one or more computers or processors configured to carry out an algorithm disclosed in FIG. 2 and this paragraph.

Figure 3:
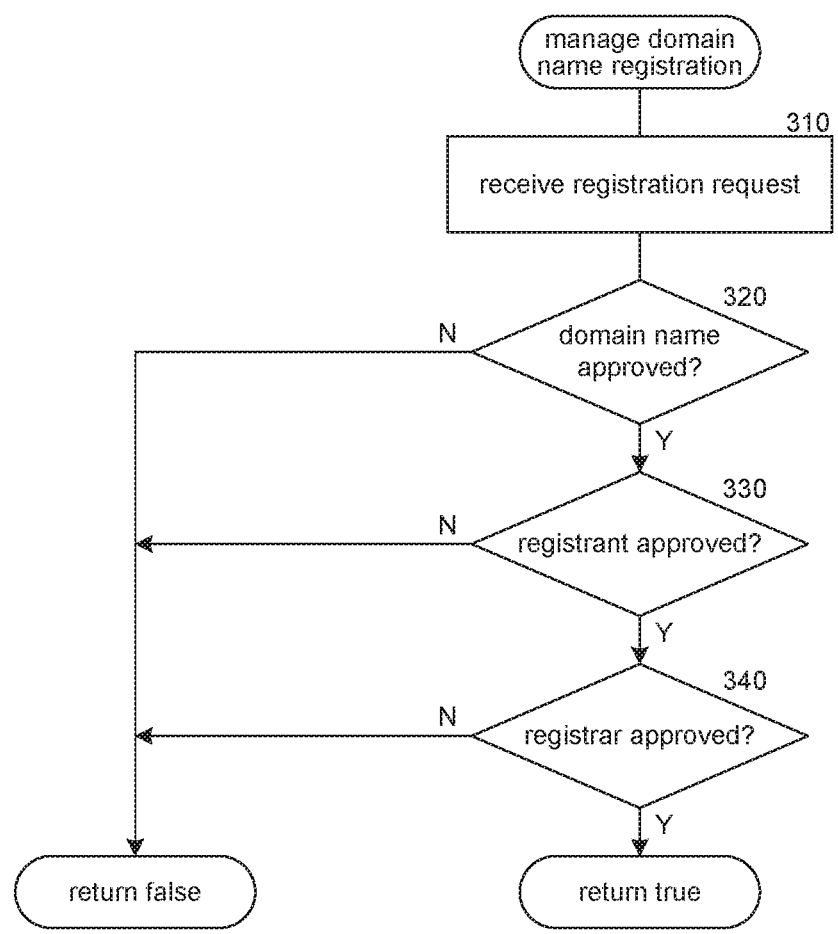
FIG. 3 is a flow diagram illustrating the processing of a verify registration component.

FIG. 3 is a flow diagram illustrating the processing of a verify registration component in accordance with some embodiments of the disclosed technology. The manage registration component is invoked to approve or deny a domain name registration request. In block 310, the component receives registration information, including, for example, identification or credential information for the registrant, identification or credential information for the registrar, and/or the target domain name. In decision block 320, if the domain name is approved for registration by the verification system, then the component continues at decision block 330, else the component returns false (i.e., an indication that the domain name is not approved for registration) and completes. For example, the verification system may prevent registrations for domain names that include certain words or phrases. In decision block 330, if the registrant is approved by the verification system to register domain names under its control, then the component continues at decision block 340, else the component returns false (i.e., an indication that the registrant is not approved to register domain names) and completes. For example, the verification system may prevent a particular user or group of users (e.g., terrorists), but not necessarily all users, from registering protected domain names. In decision block 340, if the registrar is approved by the verification system to register the target domain name, then the component returns true (i.e., an indication that the registration is approved) and completes, else the component returns false and then completes. In some embodiments, a means for verifying domain name registrations comprises one or more computers or processors configured to carry out an algorithm disclosed in FIG. 3 and this paragraph.

Figure 4:
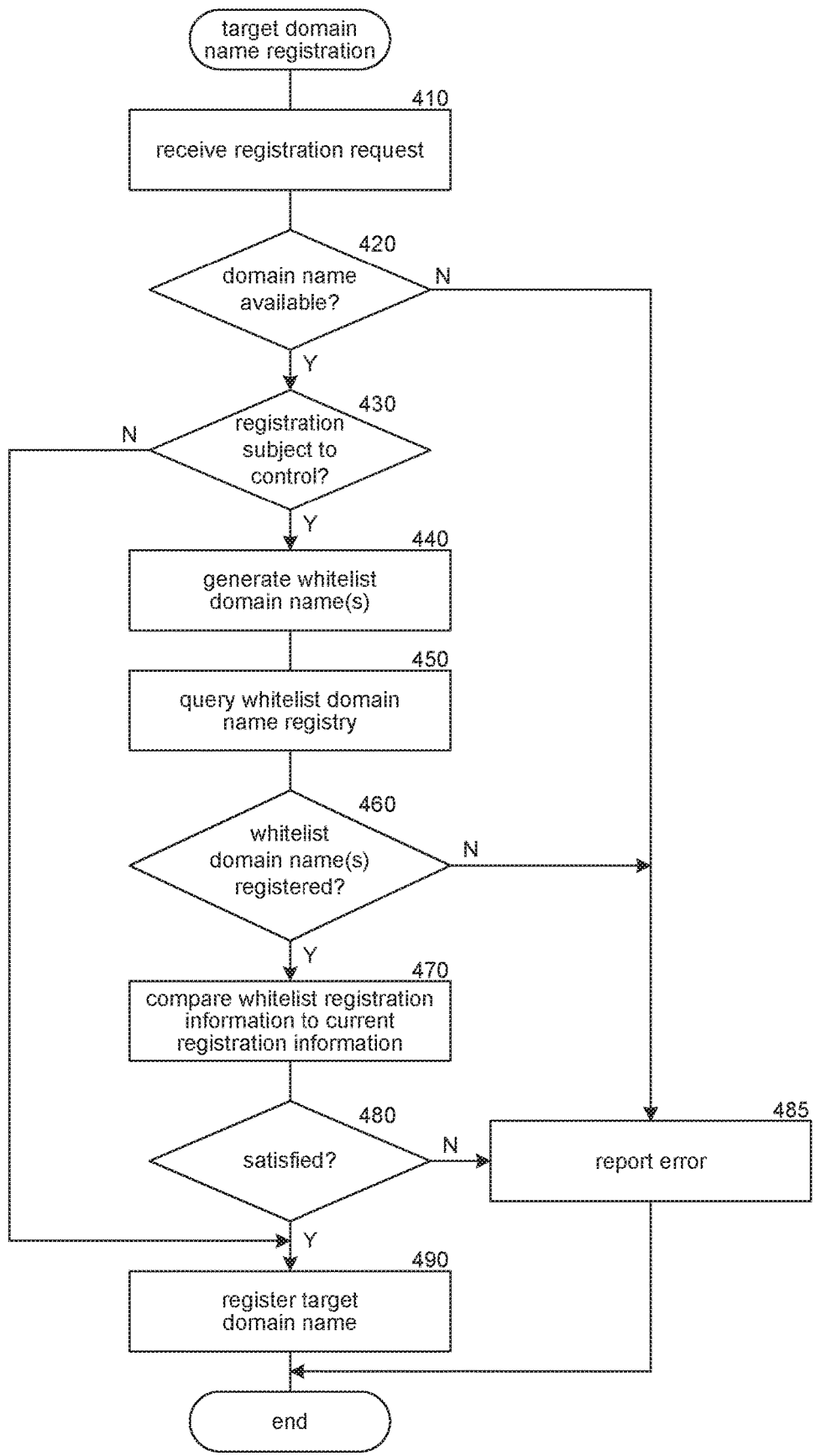
FIG. 4 is a flow diagram illustrating the processing of a target domain name registration component.

FIG. 4 is a flow diagram illustrating the processing of a target domain name registration component in accordance with some embodiments of the disclosed technology. The target domain name registration component is invoked to register a target domain name according to whitelist procedures. In block 410, the component receives one or more commands to register a target domain, such as a command from a registrar or registrant. The one or more commands may include, for example, a domain name, identification information for the registrant and/or registrar. In decision block 420, if the domain name is available (i.e., not currently registered), then the component continues at decision block 430, else the component continues at block 485. In decision block 430, if the registration is subject to control by a verification system, then the component continues at block 440, else the component continues at block 490. In block 440, the component generates one or more whitelist domain names for the target domain name and the registration in accordance with whitelist domain name generation procedures established by, for example, a corresponding verification system, a shared registry system, a registry operator, and so on. For example, for a registration request for the domain name "Miami.trips" from a registrar having a previously-assigned unique IANA number of 146 on behalf of a user with the unique identification number of UID5439394, the component may generate a whitelist domain name of:

(1) UID5439394.146.Miami.trips.valid.zone,
(2) Miami.trips.UID5439394.146.valid.zone,
(3) 146.Miami.trips.UID5439394. valid.zone, or
(4) Miami.trips.valid.zone.

Examples (1)-(3) include information representing the registrant, the registrar, the target domain name, and a whitelist subdomain ("valid.zone" in this example). Example (4) only includes the target domain name and the whitelist subdomain. With respect to example (4), the system may store identification information for the registrant and/or registrar in association with a registration of the whitelist domain name, such as in a WHOIS or DNS record. In some examples, the component may generate multiple whitelist domain names for the registration, such as:

(5) UID5439394 .Miami.trips.valid.zone, and
(6) 146.Miami.trips.valid.zone.

Each of the above whitelist domain names represents one or more aspects of the registration, such as the registrant, the target domain name, and the whitelist subdomain (example 5), or the registrar, the target domain name, and the whitelist subdomain (example 6). In block 450, the component queries the corresponding whitelist domain name registry system to determine whether the generated whitelist domain name(s) are registered therein. If the generated whitelist domain name(s) are not registered therein, then the registrant and/or registrar have not been pre-approved by the corresponding verification system to register the target domain name and the request can be denied. In decision block 460, if the generated whitelist domain name(s) are registered in the corresponding whitelist domain name registry, then the component continues at block 470, else the component continues at block 485. In block 470, the component compares whitelist registration information to registration information for the current request. For example, the component may retrieve registrant and registrar information from the whitelist domain name registry system and compare the retrieved information to the information included with the registration request received in block 410. In some examples, the component may rely on the use of whitelist domain name(s) generated using unique registrant and/or registrar identification information (e.g., both during registration of the whitelist domain name(s) and in block 440) to validate the registrant and registrar. In decision block 480, if the registrant and/or registrar are approved to register the target domain name, then the component continues at block 490, else the component continues at block 485. In block 490, the component writes the target domain name to a registry and then completes. Thus, if a party registering a target domain name is not subject to control or oversight by a verification system, that party may be able to beat a party subject to control or oversight by the verification system to the registration if, for example, approval by the verification system is delayed. In block 485, the component reports an error message and then completes. In some embodiments, a means for registering target domain names in accordance with a whitelist domain name registry system comprises one or more computers or processors configured to carry out an algorithm disclosed in FIG. 4 and this paragraph.

Figure 5:
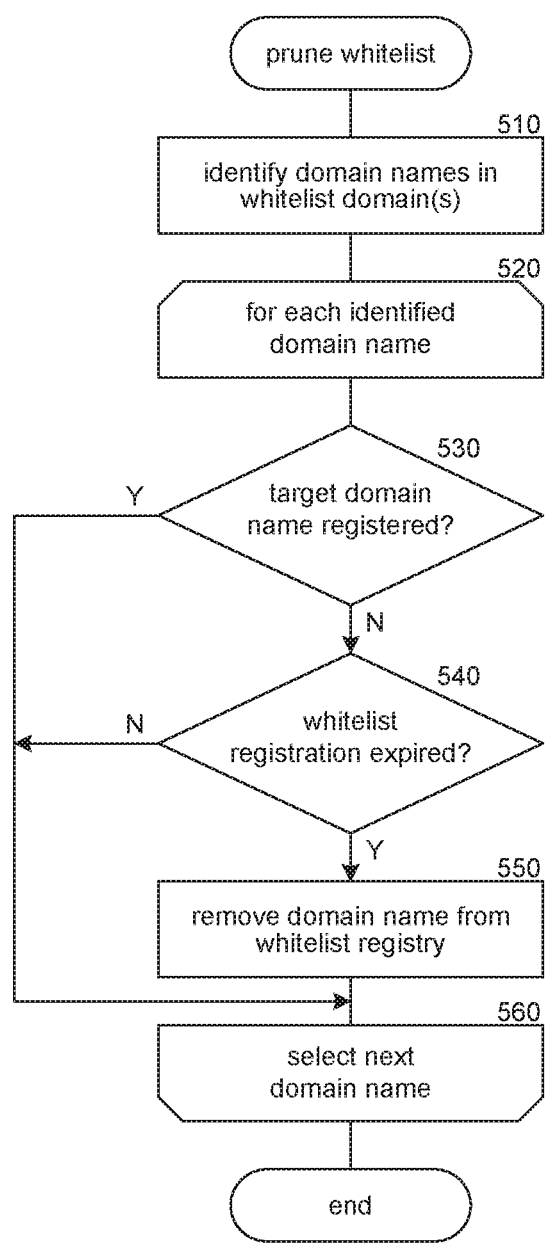
FIG. 5 is a flow diagram illustrating the processing of a prune whitelist component.

FIG. 5 is a flow diagram illustrating the processing of a prune whitelist component in accordance with some embodiments of the disclosed technology. The prune whitelist component is invoked periodically (e.g., once per second, once per minute, hourly, daily, weekly, monthly) to de-register whitelist domain names that have expired due to their corresponding target domain names having not been registered in a predetermined timeframe. For example, a whitelist domain name may expire after one year if its corresponding target domain name has not been registered. In block 510, the component identifies domain names in one or more whitelist domains (or subdomains), such as "valid.zone," "whitelist.zone," "preapproved.works," and so on. In blocks 520-560, the component loops through each of the identified domain names and de-registers the expired domain names. In decision block 530, if the corresponding target domain name for the currently-selected whitelist domain name is registered, then the component continues at block 560, else the component continues at decision block 540. In decision block 540, if the whitelist registration has expired, then the component continues at block 550, else the component continues at block 560. In block 550, the component removes the currently-selected whitelist domain name from the whitelist domain name registry system. In block 560, the component selects the next identified domain name and if all of the identified domain names have been selected, processing of the component completes. In some embodiments, a means for pruning a whitelist registry comprises one or more computers or processors configured to carry out an algorithm disclosed in FIG. 5 and this paragraph.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C §112(f), other aspects may likewise be embodied as a means-plus-function claim, or in other forms, such as being embodied in a computer-readable medium. (Any claims intended to be treated under 35 U.S.C. §112(f) will begin with the words "means for", but use of the term "for" in any other context is not intended to invoke treatment under 35 U.S.C. §112(f).) Accordingly, the applicant reserves the right to pursue additional claims after filing this application to pursue such additional claim forms, in either this application or in a continuing application.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, performed by a computing system having one or more processors, the method comprising:
   receiving, by a whitelist domain name registry system, from an Internet domain name registrar on behalf of a registrant, a first set of one or more commands to register a first domain name on behalf of the registrant, wherein the first set of one or more commands to register the first domain name on behalf of the registrant include: credentials for the registrant, and the first domain name;
   sending, by the whitelist domain name registry system to a verification system, the credentials for the registrant;
   receiving, by the whitelist domain name registry system, from the verification system, an indication that the verification system has approved the registrant to register the first domain name;
   in response to receiving, from the verification system, the indication that the verification system has approved the registrant to register the first domain name and in response to receiving an indication that the first domain name has not yet been registered, generating a whitelist domain name,
  wherein the generated whitelist domain name is not identical to the first domain name and wherein the generated whitelist domain name is generated based at least in part on the first domain name and includes at least a portion of a whitelist subdomain name;
registering the generated whitelist domain name with the whitelist domain name registry system at least in part by writing the generated whitelist domain name to the whitelist domain name registry system without registering the first domain name included in the first set of one or more commands to register the first domain name on behalf of the registrant,
  wherein writing the generated whitelist domain name to the whitelist domain name registry system indicates that the first domain name is approved to be registered on behalf of the registrant;
receiving, at a target domain name registry system, a second set of one or more commands to register the first domain name on behalf of the registrant, wherein the target domain name registry system is different from the whitelist domain name registry system;
generating, by the target domain name registry system, the whitelist domain name;
determining, by the target domain name registry system, that the generated whitelist domain name exists in the whitelist domain name registry system; and
in response to determining, by the target domain name registry system, that the generated whitelist domain name exists in the whitelist domain name registry system,
  retrieving, by the target domain name registry system, registration information for the generated whitelist domain name,
  comparing, by the target domain name registry system, the retrieved registration information to registration credentials,
  evaluating, by the target domain name registry system, the second set of one or more commands to register the first domain name on behalf of the registrant based at least in part on the comparison of the retrieved registration information to the registration credentials and wherein the first domain name is not currently registered in the target domain name registry system at the time of the evaluating, and
  registering the first domain name with the target domain name at least in part by writing, by the target domain name registry system, the first domain name to a domain name system (DNS) server associated with the target domain name registry system so that the first domain name is registered in the target domain name registry system.

2. The method of claim 1 wherein each domain name registry system is a Shared Registry System.

3. The method of claim 1, wherein the first set of one or more commands to register the first domain name further includes credentials for the Internet domain name registrar.

4. The method of claim 3, further comprising:
  sending the credentials for the Internet domain name registrar to the verification system.

5. The method of claim 1, wherein the second set of one or more commands to register the first domain name on behalf of the registrant further includes credentials for the Internet domain name registrar.

6. The method of claim 1 wherein the generated whitelist domain name further includes an identifier for the Internet domain name registrar.

7. The method of claim 6 wherein the whitelist domain name includes a concatenation of at least the first domain name, the identifier for the registrant, and the identifier for the Internet domain name registrar.

8. The method of claim 1 wherein writing the generated whitelist domain name to the whitelist domain name registry system does not include writing the first domain name to a domain name system server external to the whitelist domain name registry system.

9. The method of claim 1, further comprising:
  in response to determining, by the target domain name registry system, that a
  second generated whitelist domain name does not exist in the whitelist
  domain name registry system,
  determining, by the target domain name registry system, that a second registrant is subject to control by the verification system, and
  in response to determining that the second registrant is subject to control by the verification system,
    denying a request to register a second target domain name on behalf of a second registrant.

10. The method of claim 1, further comprising:
  in response to determining, by the target domain name registry system, that a second generated whitelist domain name does not exist in the whitelist domain name registry system,
    determining, by the target domain name registry system, that a second target domain name is subject to control by the verification system, and
    in response to determining that the second target domain is subject to control by the verification system,
      denying a request to register the second target domain name on behalf of a second registrant.

11. The method of claim 1 wherein the sending occurs in response to determining that at least the registrant or the Internet domain name registrar is subject to control or oversight by the verification system.

12. The method of claim 1 wherein the sending occurs in response to determining that the first domain name is subject to control or oversight by the verification system.

13. The method of claim 1, wherein each set of one or more commands to register the first domain name on behalf of the registrant includes registration credentials.

14. The method of claim 13, further comprising:
  in response to determining, by the target domain name registry system, that the generated whitelist domain name exists in the whitelist domain name registry system,
    retrieving, by the target domain name registry system, registration information for the generated whitelist domain name,
    comparing, by the target domain name registry system, the retrieved registration information for the generated whitelist domain name to the registration credentials of the second set of one or more commands to register the first domain name on behalf of the registrant, and
    evaluating, by the target domain name registry system, the second set of one or more commands to register the first domain name on behalf of the registrant based at least in part on the comparison of the retrieved registration information to the registration credentials of the second set of one or more commands to register the first domain name on behalf of the registrant.

15. The method of claim 1, wherein the whitelist domain name includes a concatenation of at least the first domain name and an identifier for the registrant, the method further comprising:
   determining that the registrant is pre-approved to register the first domain name at last in part by determining that the whitelist domain name that includes the concatenation of at least the first domain name and the identifier for the registrant is registered in the whitelist domain name registry system.

16. The method of claim 1, wherein the whitelist domain name includes a concatenation of at least the first domain name and an identifier for a registrar, the method further comprising:
   determining that the registrar is pre-approved to register the first domain name on behalf of the registrant at last in part by determining that the whitelist domain name that includes the concatenation of at least the first domain name and the identifier for the registrar is registered in the whitelist domain name registry system.

17. The method of claim 1, further comprising:
   in response to determining, by the target domain name registry system, that a second generated whitelist domain name does not exist in the whitelist domain name registry system,
      determining, by the target domain name registry system, that a second registrant is subject to control by the verification system, and
      in response to determining that the second registrant is subject to control by the verification system,
         denying a request to register a domain name on behalf of the second registrant.

18. A computer-readable storage device storing instructions that, in response to being executed by a computing system having one or more processors, cause the computing system to perform a method, the method comprising:
   receiving a first set of one or more commands to register a first domain name;
   determining whether the first domain name is approved to be registered;
   in response to determining that the first domain name is approved to be registered and in response to receiving an indication that the first domain name has not yet been registered,
      generating a whitelist domain name that is different from the first domain name, wherein the generated whitelist domain name is generated based at least in part on the first domain name and includes at least a portion of a whitelist subdomain name, and
      writing the generated whitelist domain name to a whitelist domain name registry system without registering the first domain name;
   after writing the generated whitelist domain name to the whitelist domain name registry system, receiving a second set of one or more commands to register the first domain name, wherein the second set of one or more commands to register the first domain name are received before the first domain name is registered in a target domain name registry system; and
   in response to determining that the generated whitelist domain name exists in the whitelist domain name registry system,
      registering the first domain name in the target domain name registry system at least in part by writing the first domain name to the target domain name registry system, wherein the target domain name registry system is different from the whitelist domain name registry system.

19. The computer-readable storage device of claim 18, wherein at least one of the one or more commands to register the first domain name includes:
   credentials for a registrant,
   credentials for a registrar, and
   the first domain name.

20. The computer-readable storage device of claim 19, wherein determining whether the first domain name is approved to be registered comprises:
   determining whether the registrant is approved to register the first domain name; and
   determining whether the registrar is approved to register the first domain name.

21. The computer-readable storage device of claim 18, wherein writing the generated whitelist domain name to the whitelist domain name registry system comprises:
   writing the generated whitelist domain name to a DNS server, a WHOIS server, an RDAP server, an RDDS server, or any combination thereof, that is not publicly-accessible.

22. The computer-readable storage device of claim 18, wherein writing the generated whitelist domain name to the whitelist domain name registry system enables the generated whitelist domain name to be readable via the DNS protocol, the RDAP protocol, the WHOIS protocol, an RDDS server, or any combination thereof.

23. The computer-readable storage device of claim 18, wherein writing the first domain name to the target domain name registry system comprises:
   writing the first domain name to at least one of a DNS server, an RDAP server, a WHOIS server, an RDDS server, or any combination thereof.

24. The computer-readable storage device of claim 18, wherein the generated whitelist domain name is not written in the target domain name registry system and the first domain name is not written in the whitelist domain name system.

25. The computer-readable storage device of claim 18, wherein each entry in the whitelist domain name registry system corresponds to a target domain name that has been pre-approved for registration in another registry system by a corresponding pre-qualified registrant.

26. The computer-readable storage device of claim 18, the method further comprising:
   receiving a third set of one or more commands to register a second domain name on behalf of a second registrant;
   in response to receiving the third set of one or more commands to register the second domain name on behalf of the second registrant, generating a whitelist domain name that includes a concatenation of at least the second domain name and an identifier for the second registrant;
   receiving a fourth set of one or more commands to register the second domain name on behalf of a third registrant; and
   in response to receiving the fourth set of one or more commands to register the second domain name on behalf of the third registrant, generating a whitelist domain name that includes a concatenation of at least the second domain name and an identifier for the third registrant.

27. The computer-readable storage device of claim 18, the method further comprising:
- receiving, from a verification system, an indication that a registrant has sought, from the verification system, pre-approval to register the first domain name; and
- receiving, in response to the verification system pre-approving the registrant to register the first domain name, an indication that a whitelist domain name corresponding to the first domain name was registered with the whitelist domain name registry system, wherein the whitelist domain name corresponding to the first domain name is different from the first domain name.

28. A computing system comprising:
- a processor;
- a memory;
- a component configured to receive one or more commands to register a first domain name on behalf of a registrant;
- a component configured to, in response to receiving, from a verification system, an indication that the verification system has approved the registrant to register the first domain name and in response to receiving an indication that the first domain name has not yet been registered, generate a whitelist domain name that is different from the first domain name, wherein the generated whitelist domain name is based at least in part on the first domain name and includes at least a portion of a whitelist subdomain name, and
  - write the generated whitelist domain name to a whitelist domain name registry system without registering the first domain name;
- a component configured to, after writing the generated whitelist domain name to the whitelist domain name registry system, receive a second set of one or more commands to register the first domain name; and
- a component configured to, after receiving the second set of one or more commands to register the first domain name and in response to determining that the generated whitelist domain name exists in the whitelist domain name registry system,
  - register the first domain name with a target domain name registry system at least in part by writing the first domain name to the target domain name registry system, wherein the target domain name registry system is different from the whitelist domain name registry system so that the first domain name is registered in the target domain name registry system, wherein the generated whitelist domain name is different from the first domain name,
- wherein each of the components comprises computer-executable instructions stored in the memory for execution by the processor.

29. The computing system of claim 28, wherein the second set of one or more commands to register the first domain name includes:
- credentials for a registrant, credentials for a registrar, the first domain name, or any combination thereof.

* * * * *